(12) United States Patent
Synal et al.

(10) Patent No.: US 11,070,668 B2
(45) Date of Patent: Jul. 20, 2021

(54) ADVANCED CALL LOG NOTIFICATIONS

(71) Applicant: T-Mobile USA, Inc., Bellevue, WA (US)

(72) Inventors: Adrian Synal, Kirkland, WA (US); Vinod Ravichandran, Renton, WA (US); Michele Kinsey, Shoreline, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/234,439

(22) Filed: Dec. 27, 2018

(65) Prior Publication Data

US 2020/0213443 A1 Jul. 2, 2020

(51) Int. Cl.
*H04M 3/42* (2006.01)
*H04M 3/46* (2006.01)

(52) U.S. Cl.
CPC ... *H04M 3/42238* (2013.01); *H04M 3/42059* (2013.01); *H04M 3/46* (2013.01); *H04M 3/465* (2013.01); *H04M 2203/551* (2013.01); *H04M 2203/558* (2013.01); *H04M 2203/6081* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0114743 | A1* | 6/2004 | Gilbert | H04M 1/57 379/142.04 |
| 2006/0116113 | A1* | 6/2006 | Gass | H04M 3/2218 455/414.4 |
| 2011/0038469 | A1* | 2/2011 | Clark | H04M 3/02 379/130 |
| 2014/0037079 | A1* | 2/2014 | Cao | H04M 1/656 379/142.17 |
| 2015/0373194 | A1* | 12/2015 | Guo | H04M 3/46 370/352 |
| 2017/0171384 | A1* | 6/2017 | Ghuli | H04M 3/42059 |

* cited by examiner

*Primary Examiner* — Steven S Kelley
(74) *Attorney, Agent, or Firm* — Han Santos, PLLC (57) ABSTRACT

Techniques are described herein for providing call logs for cellular and internet calls that are rerouted to one or more terminating caller devices. The techniques include: organizing a call routing scheme based on call routing configuration settings, the call routing scheme directing routing of incoming calls to one or more user devices that receives service from a telecommunications network; receiving a call log request from a user device that includes a unique identifier of the user device or a user; transmitting the call log request to a database server of the telecommunications network to obtain a call log for an incoming call to the one or more user devices, the incoming call being routed according to the call routing scheme; and sending the call log to the user device to display the call log information at the user device.

20 Claims, 5 Drawing Sheets

ADVANCED CALL LOG NOTIFICATIONS

BACKGROUND

A number of cellular and Internet-enabled devices can be used to provide a cellular voice connection and/or web-based voice or video calls. Various call routing systems can be implemented to customize how incoming calls are routed within an organization. For example, a call routing system can utilize a call forwarding feature to forward all incoming calls to one phone number to another phone number. Calls can be forwarded when a user is out of the office, no one answers an incoming call, the line is busy, and/or so forth. Generally, calls are logged in a call log internal to the caller device that made or received the calls. Thus, the call log on the caller device does not include forwarded calls or calls that are routed to another caller device.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for compiling and disseminating call logs for incoming calls that are routed to one or more terminating caller devices. Various types and/or a number of the user equipment can communicate using voice and data connections and/or using Internet-based voice calls (voice over Internet protocol (VoIP)) and/or video calls (e.g., Skype™). In various embodiments, a call routing scheme can be implemented to determine whether an incoming call is to be routed from an originating caller device to one or more terminating caller devices, wherein the call routing scheme can be based at least partially on a call routing configuration setting that is inputted via a user account of an authorized user. Thus, the call routing configuration setting can be determined by one or more users. In one instance, one or more users of a group of users may input a call routing configuration setting that affects the caller devices of the remaining users of the group. Calls can be routed from a single destination phone number associated with one or more terminating caller devices to a plurality of destination phone numbers associated with a plurality of terminating caller devices, and vice versa. Additionally, or alternatively, calls can be forwarded from a first group of one or more destination phone numbers associated with a first group of terminating caller devices to a second group of one or more destination phone numbers associated with a second group of terminating caller devices, and so on.

The call routing scheme can be implemented when one or more predetermined conditions are met. For instance, calls can be forwarded when the recipient is busy, ring no answer (RNA) timeout occurs, the recipient is unreachable, the recipient is out of the office (OOO), the recipient rejects the incoming calls, the recipient manually forwards the incoming calls, and/or so forth. The call routing scheme can include various call routing and answering rules. For example, calls can be forwarded to specific destination phone numbers for certain callers or times of the day.

In various embodiments, call logs can be stored in a database server such as a call log database server and/or in a call log internal to the caller device that made or received the calls. Call logs can be compiled and disseminated to one or more user equipment in communication with network servers on multiple types of networks. The network servers can gather call log data and other information from a database server, cloud-based storage servers, onboard call logs, and other entities to provide call logs to one or more user equipment. The one or more user equipment can comprise one or more terminating caller devices and/or a preselected user equipment. It is contemplated that one or more user equipment can include an application installed on the user equipment. The application may also be configured to request or retrieve call log information from various data sources to present to a user.

Enabling a user to input call routing configuration settings allows the user to organize a call routing scheme for a plurality of caller devices within an organization, thereby eliminating the need for each user in the organization to individually set up a call routing scheme. Additionally, providing call logs to a user enable the user to review call log information related to routed incoming calls even when the user does not directly make or receive the calls. Thus, the user can determine whether to make follow up on the calls without making additional calls or performing additional tasks. This can reduce call volume experienced by a network, conserve network resources, and reduce network traffic. The techniques described herein may be implemented in a number of ways. Example implementations are provided below with reference to the following figures.

Example Network Architecture

Figure 1:
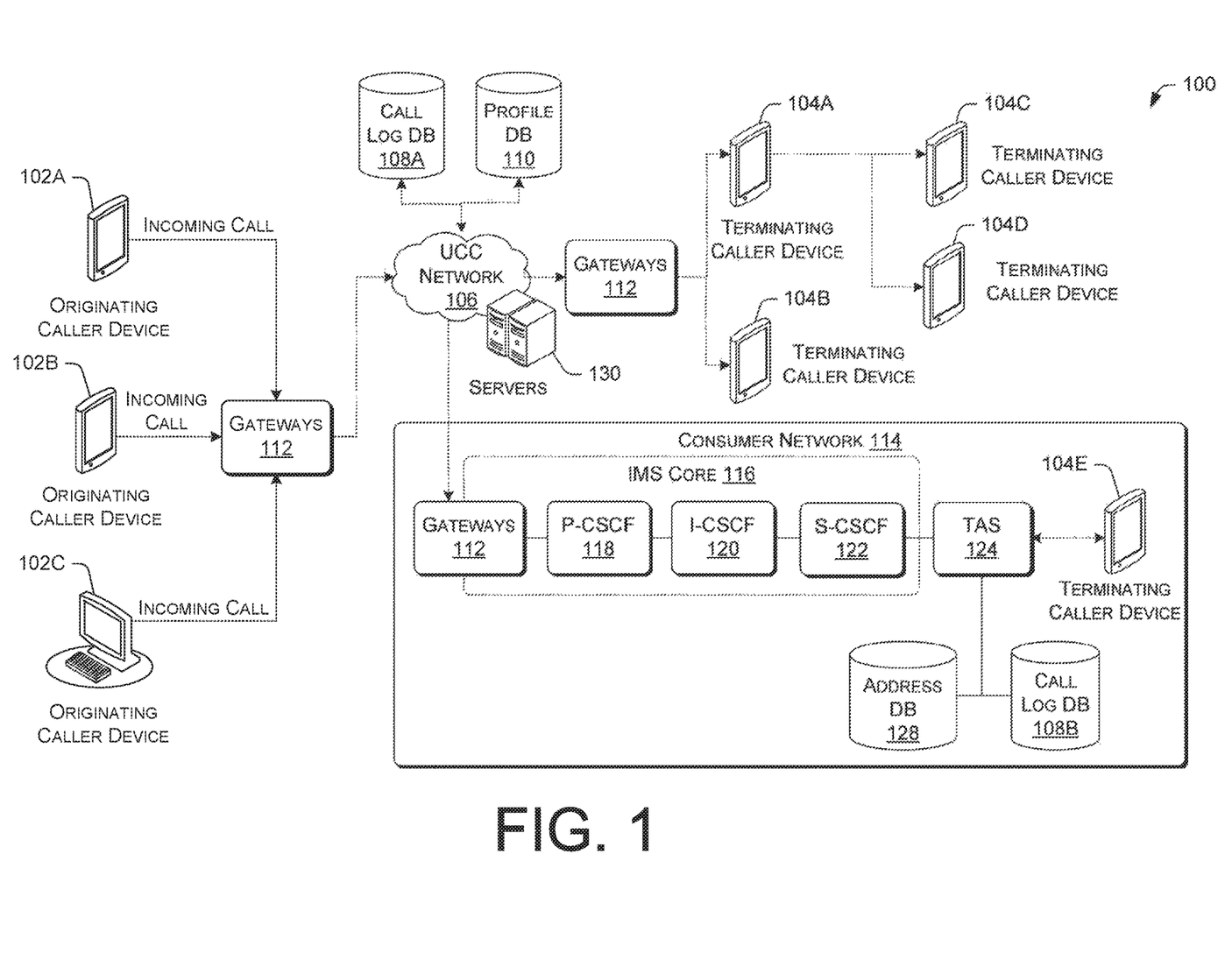
FIG. 1 illustrates example network architecture for implementing advanced call notifications when forwarding incoming calls.

FIG. 1 illustrates example architecture for conducting advanced call logging when routing incoming calls from an originating caller device to one or more terminating caller devices. The architecture may include one or more user equipment comprising originating caller devices 102A-102C and one or more terminating caller devices 104A-104D. The originating caller devices 102A-102C and the terminating caller devices 104A-104D can comprise smartphones, mobile devices, personal digital assistants (PDAs), desktop computers, laptops, tablets, smartwatches, or other electronic devices having a wireless communication function that are capable of receiving input, processing the input, and generating output data. The originating caller devices 102A-102C and the terminating caller devices 104A-104D are connected to a network via gateways 112 utilizing one or more wireless base stations or any other common wireless or wireline network access technologies.

The originating caller devices 102A-102C and the terminating caller devices 104A-104D can connect to multiple networks and types of networks that provide a variety of services. For instance, the one or more networks may include a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet). In the illustrated embodiment, the collection of one or more networks may be referred to as a unified communications and collaboration (UCC) network 106 and the gateways 112 can comprise a Web Real-Time Communication (WebRTC) gateway (WRG).

The UCC network 106 can comprise various network elements, including one or more servers, databases, data store, cloud storage, and/or a distributed storage system. The network elements can comprise a plurality of physical machines such as general-purpose computers, such as desktop computers, tablet computers, laptop computers, servers (e.g., on-premise servers), or other electronic devices that are capable of receiving input, processing the input, and generating output data. The network elements can also comprise a plurality of virtual machines (e.g., virtual engines (VE), virtual private servers (VPS)). The network elements may be operated by a telecommunications service provider (e.g., a mobile network operator (MNO)) or a third-party entity that is working with the telecommunications service provider.

The one or more servers, databases, data store, cloud storage, and/or a distributed storage system are in communication with one or more originating caller devices and/or one or more terminating caller devices via a cellular and/or WiFi data connection. In this way, the originating caller devices 102A-102C and/or terminating caller devices 104A-104C can store a backup of the call log, user contacts, calendars, and other data. Data may be stored for long periods of time and replicated to guarantee reliability. In various embodiments, the one or more servers, databases, data store, cloud storage, and/or a distributed storage system can implement a data management layer that includes software utilities for facilitating the acquisition, processing, storing, reporting, and analysis of data from multiple data sources. In the illustrated embodiment, the databases comprise a call log database 108A and a profile database 110 (e.g., HSS/HLR). The call log database 108A may store call log information for WebRTC, including, for example, the recipient's phone number or IP address, call time and duration, call type (incoming, outgoing, missed, ignored, etc.), and/or so forth. The call log information may include call logs that are stored for originating caller devices 102A-102C and call logs for terminating caller devices 104A-104D.

The originating caller devices 102A-102C can initiate a call in various ways. For instance, calls made from a first originating caller device 102A over the cellular network can be routed through one or more base stations, via one or more servers, switches, and routers of the UCC network 106 through one or more additional base stations to the first terminating caller device 104A, or the recipient. In another example, WebRTC can be used to route calls directly from a WebRTC client on a second originating user device 102B through the UCC network 106 to a WebRTC client on the second terminating caller device 104B.

One or more servers 130 in the UCC network 106 may be configured to provide a call management service. For instance, the server 130 can route an incoming call from an originating caller device 102A-102C to one or more terminating caller devices 104A-104B based on a call routing scheme. The incoming call can be a voice call (e.g., cellular) and/or a video call (e.g., VoIP, WebRTC). The call routing scheme can be based on a call routing configuration setting that corresponds to a user account that is associated with one or more terminating caller devices 104A-104D, wherein the user account can correspond to an account identifier that is associated with one or more subscribers of a telecommunications service provider. For example, the account identifier may be a Mobile Station International Subscriber Directory Number (MSISDN), an International Mobile Subscriber Identity (IMSI), a subscriber account number, a WebRTC account identifier, a subscriber identifier that is associated with multiple user devices, or another unique account identifier.

The call routing scheme can be stored in a user information server or in a designated call management database, depending upon embodiments. Thus, the server 130 can obtain a call routing scheme from one or more remote databases or from user input. One or more terminating caller devices 104A-104D can provide an interface (e.g., via an application that can reside at least partially on the terminating caller devices 104A-104D) for receiving user input for the call routing configuration settings, which enables one or more users associated with the terminating caller devices 104A-104D to create and/or customize call routing and answering rules for the call routing scheme. In various embodiments, the server 130 may use a user authentication mechanism to ensure that only authorized users are permitted to input call routing configuration settings. For example, the user authentication mechanism may validate a user as an authorized subscriber or authorized customer care representative of a telecommunications service provider based on one or more user authentication credentials. For example, the user authentication credentials may include an account identifier. An authorized user may be a user (e.g., a business subscriber) that is designated to configure a call routing scheme for a group of terminating caller devices. For instance, the terminating caller devices 104A-104D may belong to a business group of a business organization. Accordingly, a supervisor of the business group may use one of the terminating caller devices to access the server 130 and input a call routing scheme that affects one or more of the terminating caller devices 104A-104D.

In various embodiments, the call routing scheme can include rules for forwarding incoming calls. Without limitations, incoming calls can be forwarded or rerouted during the following scenarios: when the recipient is busy, ring no answer (RNA) timeout occurs, the recipient is unreachable, the recipient is out of the office (OOO), the recipient rejects the incoming calls, the recipient manually forwards the incoming calls, and/or so forth. In one example, incoming calls can be routed using round robin to distribute calls evenly among a plurality of terminating caller devices 104A-104D working under an organization. More specifically, the round robin enables a user to input a plurality of destination phone numbers and route calls to them sequentially. Thus, an incoming call can be sent to a specific queue. Additionally, the user can select the duration that he or she wants each phone number to ring (e.g., 5, 10, 15 seconds). If an incoming call is received by the first destination phone number in the queue and goes unanswered for a predetermined amount of time, the call can go to the second destination number, and so on. If none of the destination numbers in the round robin answers the call, the call can proceed to the next step defined by the call routing scheme.

Additionally, or alternatively, the server 130 can perform one or more call handling tasks for the incoming call.

In another example, incoming calls can be automatically routed to the first available terminating caller device. More specifically, the server 130 can identify an available terminating caller device of a plurality of terminating caller devices. Upon identifying an available terminating caller device, the server 130 selects the terminating caller device and routes the incoming call to the selected terminating caller device. In yet another example, incoming calls can be routed using a call forwarding table. The call forwarding table can comprise a destination phone number field and a sequence number field. The destination phone number field can include a telephone number associated with a terminating caller device to which the current call should be forwarded. The sequence number field can include an integer number indicating the order in which the corresponding telephone number should be attempted for call forwarding. In this way, call forwarding can be conducted in an ordered sequence. Additionally, or alternatively, call forwarding can be attempted to multiple telephone numbers at the same time. In various embodiments, calls can be forwarded to specific destination phone numbers for certain callers or times of the day. For instance, an incoming call that originated from a caller in a terminating caller device's contacts list or address book can be automatically forwarded to that terminating caller device. Similarly, whitelisting and blacklisting techniques can be implemented to direct incoming calls from originating caller devices to one or more terminating caller devices.

Incoming calls can be forwarded from a single destination phone number associated with one or more terminating caller devices 104A-104D to a plurality of destination phone numbers associated with a plurality of terminating caller devices 104A-104D. Additionally, or alternatively, incoming calls can be forwarded from a first group of destination phone numbers associated with a first group of terminating caller devices 104A-104B to a second group of destination phone numbers associated with a second group of terminating caller devices 104C-104D. Conversely, incoming calls can be forwarded from a plurality of destination phone numbers associated with a plurality of caller devices 104A-104D to a single destination phone number associated with one or more terminating caller devices 104A-104D. In this way, calls can be forwarded to one subscriber associated with a plurality of terminating caller devices or a plurality of subscribers associated with a plurality of terminating caller devices.

In various embodiments, a user (e.g., a consumer subscriber) can configure a call routing scheme for one or more terminating caller devices, wherein the terminating caller devices may belong to the user. In the illustrated embodiment, incoming calls can be routed to at least one terminating caller device 104E in communication with a consumer network 114, rather than with the UCC network 106. The consumer network 114 refers to the portions of a wireless carrier network that service consumer subscribers of telecommunication services. The consumer network 114 comprises an IP Multimedia Subsystem (IMS) IMS core 116, which comprises gateways 112, the Call Session Control Function (CSCF) node, and telephony application server (TAS) 124. The CSCF node may handle Session Initiation Protocol (SIP) sessions, which are communication sessions for packet-based voice and video calls, instant messaging over IP networks, and/or so forth. The CSCF nodes may identify a selected terminating caller device 104E based on a registry of at least one terminating caller device 104E of a subscriber, e.g., the Implicit Registration Set (IRS), stored in a user information server (e.g., Home Subscriber Server (HSS)) of the consumer network 114. The IRS can include an IMPU of the subscriber in the form of the MSISDN as well as IP Multimedia Private Identity (IMPI) in the form of device identifiers, such as International Mobile Equipment Identity (IMEI), of the terminating caller devices. The user devices that are registered by the CSCF node of the network 114 may be able to use the common telephone number to initiate and receive communication. For example, two or more devices registered in this manner can both ring when there is an incoming call for the common telephone number. In this regard, a call routing scheme stored at the user information server can specify the order in which two or more devices with a common telephone number can ring. In various embodiments, the call routing scheme can be cached in the TAS 124. In contrast, user devices listed in the IRS, but which are not registered by the CSCF node of the consumer network 114, will not be able to initiate and receive communication that is routed via the common phone number.

In the illustrated embodiment, the CSCF node comprises a proxy CSCF (P-CSCF) 118, an Interrogating CSCF (I-CSCF) 120, and a Serving CSCF (S-CSCF) 122. The P-CSCF 118 may route incoming SIP messages to an IMS registrar server. The P-CSCF may also safeguard the security of the IMS core 116 by handling Internet Protocol Security (IPSec) for communications that are exchanged by the originating caller devices 102A-102C and terminating caller devices 104A-104D. In alternative instances, instead of SIP sessions, the P-CSCF may handle Remote Authentication Dial-In User Service (RADIUS) sessions.

The S-CSCF 122 is a central node of the signaling layer and is arranged to handle SIP registrations of the originating caller devices 102A-102C and terminating caller devices 104A-104D for IMS communications. The S-CSCF 122 has knowledge of user identification such as IMS Private User-ID uniquely identifying the originating caller devices 102A-102C and terminating caller devices 104A-104D. The I-CSCF 120 may be an inbound SIP proxy server of the IMS core 116. During IMS registration of a user device, the I-CSCF may query the HSS to obtain an address of the S-CSCF 122 and designate a S-CSCF to service the user device. The I-CSCF may be further responsible for routing incoming IMS session requests and terminating IMS sessions requests.

The CSCF node can communicate with the TAS 124. The TAS 124 can route voice and/or data communications to a terminating caller device 104E within the consumer network 114 and with other networks, including public switch telephone networks (PSTNs). For example, the TAS 124 may be a SIP application server that handles IP telephony for voice over LTE (VoLTE) services. In various embodiments, the TAS 124 can route incoming calls to the terminating caller device 104E in accordance with a call routing scheme that is associated with the terminating caller device 104E. The call routing scheme can correspond to a user account having an account identifier that is associated with the terminating caller device 104E.

The IMS core 116 can also include an address database 128 and a call log database 108B in communication with the TAS 124. The address database 128 can include an address book associated with the terminating caller device 104E, wherein the address book can comprise contacts information (e.g., phone numbers, email addresses, physical addresses) for one or more contacts. The call log database 108B may store call log information for calls that terminate at the terminating caller device 104E, such as VoIP calls and other types of calls. The call log information can include, for example, the recipient's phone number or IP address, call time and duration, call type (incoming, outgoing, missed, ignored, etc.), and/or so forth.

Call logs are generated for each call that is routed to one or more terminating caller devices 104A-104E. As discussed above, this can include identification information of an originating caller device (e.g., phone number, caller identifier, etc.), identification information of a user device that answered the call, identification information of one or more user devices that forwarded the call, call forwarding reason for each forwarding (e.g., voicemail, out-of-office setting, predetermined call routing scheme, manual call forwarding triggered, etc.), call rejection reason (call recipient user offline, call recipient unreachable, manual call ignore, etc.), call times and duration, call type, and/or other applicable information. The call logs can be stored in the call log database 108A-108B or other database servers. These database servers can provide the call log information to each respective network. In this regard, one or more servers in the network (e.g., server 130) can query a database server (e.g., call log database 108A) to provide call log information associated with one or more routed calls. For instance, the call log database 108A can provide the call log information to the terminating caller devices serviced by the UCC network 106. Similarly, the call log database 108B can provide the call log information to the terminating caller devices serviced by the consumer network 114. The call log information can be pushed to or requested by at least one user equipment. The request can include a unique identifier of the user equipment requesting the call log information. The unique identifier can include IMPI such as IMEI, a Mobile Equipment Identifier (MEID), an electronic serial number (ESN), a telephone number, an IP address, or another unique identifier of the user equipment. In various embodiments, the request can also include a universally unique identifier (UUID) if a client comprises an application (e.g., a mobile application, a web application, etc.) and/or is virtual. The user equipment may or may not include one or more of the terminating caller devices 104A-104E. More particularly, the call log information can be provided to one or more preselected terminating caller devices 104A-104E and/or user equipment. For instance, one or more terminating caller devices 104A-104E can be designated as the master device or the primary device, wherein the master device or the primary device can be associated with the primary account holder, subscriber, or an authorized user. In another example, one or more terminating caller devices 104A-104E that are authorized to configure the call routing scheme can receive call logs.

Providing call log information to one or more terminating caller devices 104A-104E and/or other user equipment for routed calls enables one or more users to review the outcome of the routed calls. For instance, if an incoming call is forwarded from a first user at a first terminating caller device 104A to a second user at a second terminating caller device 104B, providing the call log information associated with the incoming call to the first user informs the first user whether the second user answered the call or missed the call. In various embodiments, the terminating caller devices 104A-104E can include an application that is configured to request and retrieve call log information from one or more databases. The request can include a unique device identifier that is associated with the requesting terminating caller device. Additionally, the request can include a telephone number or an IP address that is associated with the incoming call. The application can provide a graphical user interface (GUI) for presenting the call log information and configuring settings for receiving the call log information. Additionally, the application may combine retrieved call logs from the one or more databases and the call log stored on the terminal caller device to create a complete call log on the terminating caller device.

Example Computing Device Components

Figure 2:
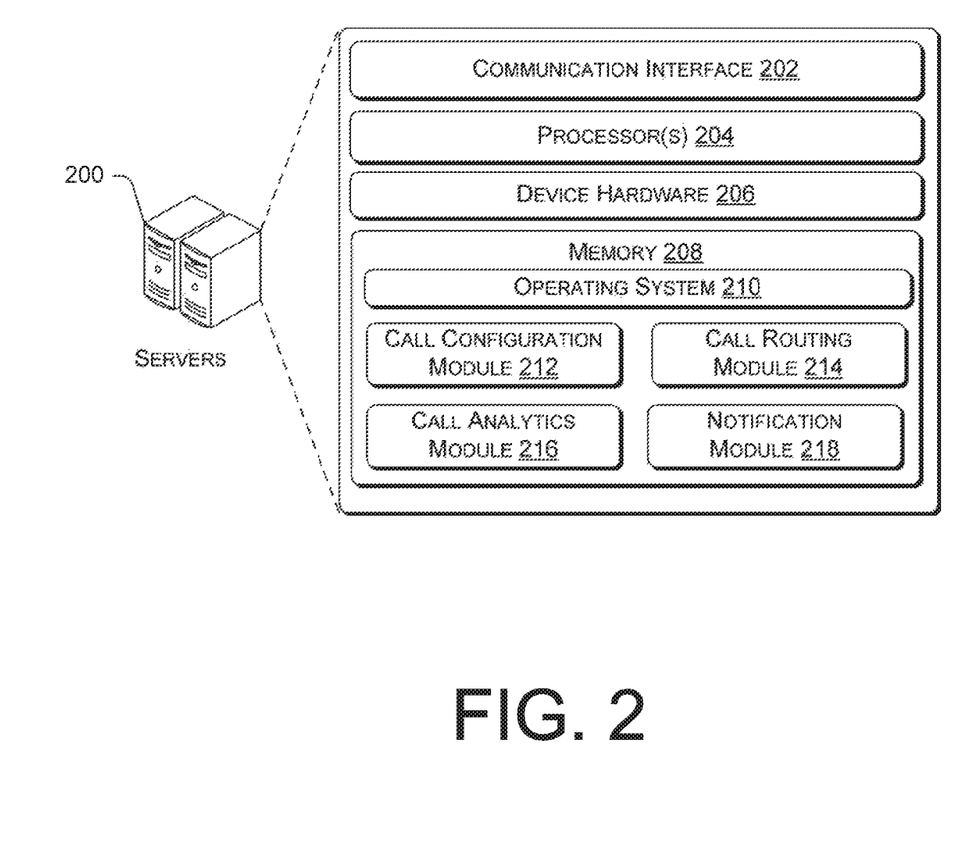
FIG. 2 is a block diagram showing various components of an illustrative computing device that implements advanced call logging.

FIG. 2 is a block diagram showing various components of an illustrative computing device, wherein the computing device can comprise one or more servers 200. It is noted that the server 200 as described herein can operate with more or fewer of the components shown herein. Additionally, the server 200 as shown herein or portions thereof can serve as a representation of one or more of the computing devices of the present system.

The server 200 may include a communication interface 202, one or more processors 204, hardware 206, and memory 208. The communication interface 202 may include wireless and/or wired communication components that enable the server 200 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, code segments, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, code segments, program modules, or other data in a modulated data signal, such as a carrier wave, or other transmission mechanisms. The memory 208 may also include a firewall. In some embodiments, the firewall may be implemented as hardware 206 in the server 200.

The processors 204 and the memory 208 of the server 200 may implement an operating system 210, a call configuration module 212, a call routing module 214, a call analytics module 216, and a notification module 218. The operating system 210 may include components that enable the server 200 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The call configuration module 212 is configured to receive call routing configuration settings for a call routing scheme associated with one or more terminating caller devices and one or more users or subscribers. The call routing scheme can apply to a group of terminating caller devices or a single terminating caller device serviced by a UCC network and/or a consumer network. The call configuration module 212 can provide an interface to receive call routing configuration settings from one or more subscribers. In various embodiments, the call routing scheme can identify one or more terminating caller devices to which an incoming call is routed.

Additionally, the call configuration module 212 can identify one or more call handling tasks to perform for one or more incoming calls when one or more predetermined conditions are met. The one or more predetermined conditions can include when a call is unanswered, a call is ignored or refused, a call is missed, and/or so forth. Without limitations, the call handling tasks can include call alerting, providing voicemail access, and/or so forth. Performing call alerting can include alerting one or more terminating caller device of a missed call. Providing voice access includes directing an incoming call to a voicemail inbox of a subscriber by an automated voicemail messaging function of the TAS or a network server.

The call routing module 214 can facilitate call flows by determining whether a call routing scheme applies to an incoming call and routing the call to one or more terminating caller devices. The call routing scheme can apply to an incoming call based on a telephone number associated with the originating caller device and/or a telephone number associated with the terminating caller device. For instance, if a telephone number associated with an originating caller device is stored in a first terminating caller device's address book, but not in a second terminating caller device's address book, an incoming call from the originating caller device can be automatically routed to the first terminating caller device. In another example, if a telephone number associated with an originating caller device is blacklisted in a first terminating caller device, but the same telephone number is not blacklisted in a second terminating caller device, an incoming call from the originating caller device can be automatically routed to the second terminating caller device.

In various embodiments, the call routing module 214 can route calls from a first terminating caller device to a second terminating caller device, and so on. The call routing module 214 can route calls from a first terminating caller device to a group of terminating caller devices, and vice versa. The call routing module 214 can also route calls from a first group of terminating caller devices to a second group of terminating caller devices, and so on. Additionally, calls can be routed to terminating caller devices serviced by a UCC network and/or a consumer network. In one example, an incoming call from an originating caller device can be routed to a first terminating caller device serviced by a UCC network and then forwarded to a second terminating caller device also serviced by the UCC network. In this scenario, the call routing scheme can be determined by an authorized user that may be a business subscriber of a telecommunications service provider. Similarly, an incoming call from an originating caller device can be routed to a first terminating caller device serviced by a consumer network and then forwarded to a second terminating caller device also serviced by the consumer network. In this scenario, the call routing scheme can be determined by a user that is a consumer subscriber of a telecommunications service provider. In another example, an incoming call from an originating caller device can be routed to a first terminating caller device serviced by a UCC network and then forwarded to a second terminating caller device serviced by a consumer network, and vice versa. In this scenario, the call routing scheme can be determined by an authorized user that may be a business subscriber and/or a consumer subscriber of a telecommunications service provider. Accordingly, a supervisor of a business group may input a call routing scheme that affects one or more terminating caller devices of the business group and that affects one or more terminating caller devices of the supervisor.

The call analytics module 216 can record incoming calls and track calls in order to perform call log analytics and share call detail reports based on call logs with one or more terminating caller devices. In various embodiments, the call analytics module 216 can detect call flow patterns. For instance, the call analytics module 216 can identify the terminating caller device that most frequently answers or ignores incoming calls. In another example, the call analytics module 216 can identify the terminating caller device receiving the most number of incoming calls within an organization. In yet another example, the call analytics module 316 can identify the peak call hours for the organization. Additionally, the call analytics module 216 may be configured to provide a visual display of the data associated with the call log information. The data can be used to reconfigure the call routing scheme. In various embodiments, the call analytics module 216 can provide recommendations for improving call flows within an organization.

The notification module 218 is configured to compile and disseminate call logs to one or more terminating caller devices, wherein the terminating caller devices can be preselected and/or associated with the same number or IP address. The notification module 218 can retrieve and/or request call log information from a cloud storage, one or more terminating caller devices, and/or one or more remote database servers (e.g., call log database) of a telecommunications network. In the latter case, the notification module 218 can transmit a query or a request to the cloud storage, one or more terminating caller devices, and/or one or more remote database servers. The query and/or the request can include device identifiers corresponding to the devices that made or received the calls, telephone number or the IP address of the devices that made or received the calls, device identifiers corresponding to the user equipment requesting the call log information, account identifiers associated with one or more subscribers and devices that made or received the calls, account identifiers associated with the user equipment requesting the call log information, and/or so forth. As noted above, devices can be identified using the corresponding IMPI such as IMEI, MEID, ESN, and/or so forth.

Upon receiving call logs, the notification module 218 may extract call log information from a file, decrypt, or otherwise make the data usable. In some instances, the notification module 218 may use a user authentication mechanism to ensure that only authorized users are permitted to receive call logs. For example, the user authentication mechanism may validate a user as an authorized subscriber or authorized customer care representative of a telecommunications service provider based on one or more user authentication credentials (e.g., an account identifier). The user authentication mechanism can also be used to determine the type of call log information to provide to a user.

Example Processes

Figure 3:
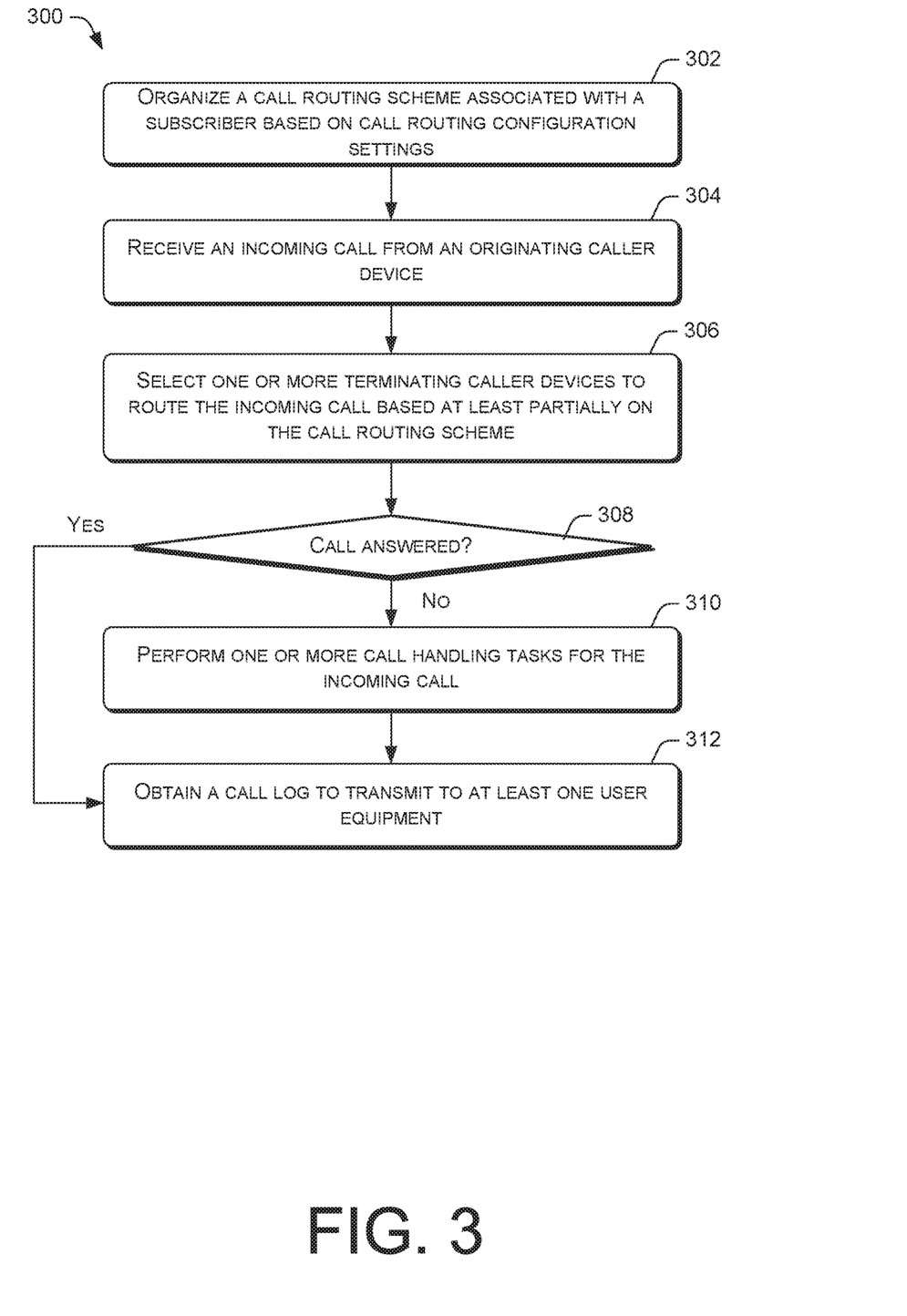
FIG. 3 is a flow diagram of an example process for logging calls that are routed from an originating calling device to one or more terminating caller devices.
Figure 4:
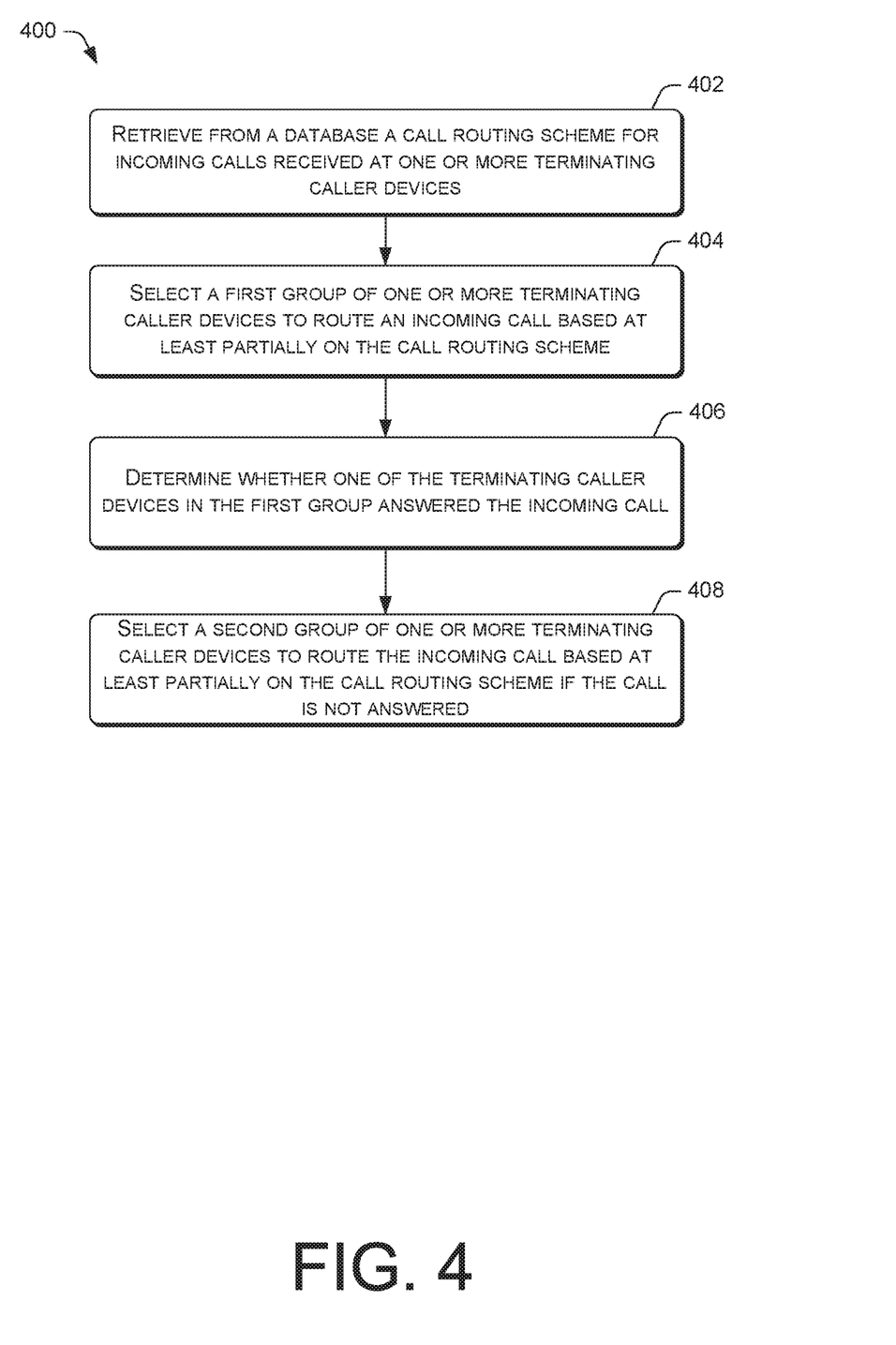
FIG. 4 is a flow diagram of an example process for forwarding calls from a first group of terminating caller devices to a second group of terminating caller devices in accordance with a call routing scheme.
Figure 5:
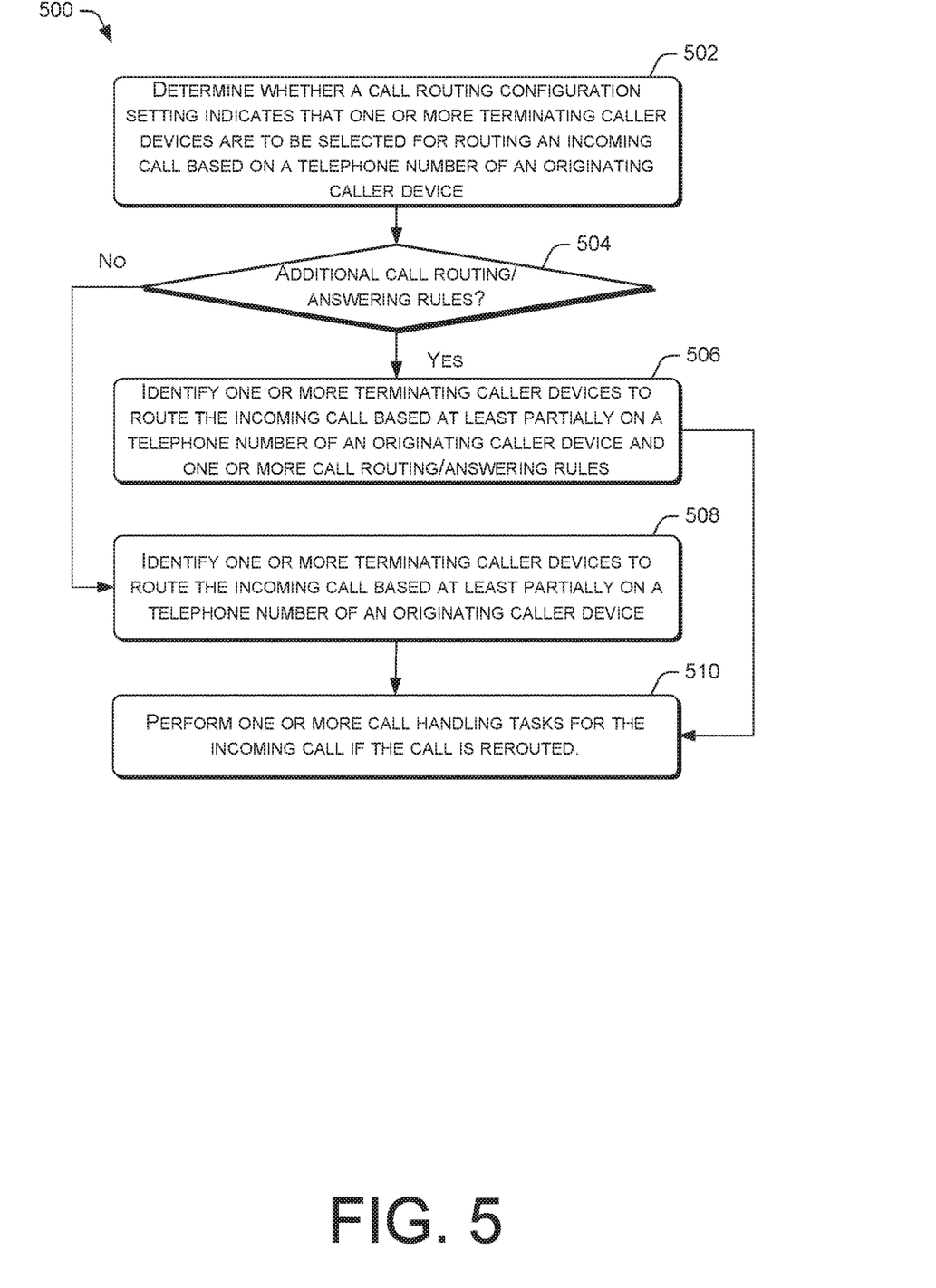
FIG. 5 is a flow diagram of an example process for selecting one or more terminating caller devices in accordance with one or more settings for a call routing scheme.

FIGS. 3 to 5 presents illustrative processes 300-500 for logging calls that are routed from an originating calling device to one or more terminating caller devices. The processes 300-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, code segments, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the network 100 of FIG. 1.

FIG. 3 is a flow diagram of an example process 300 for logging calls that are routed from an originating calling device to one or more terminating caller devices, from the perspective of one or more servers in a telecommunications network. At block 302, the server can organize a call routing scheme associated with a subscriber based on call routing configuration settings. The call routing scheme can include call routing and answering rules. At block 304, the server receives an incoming call from an originating caller device. The originating caller device can comprise various types of network-enabled devices. Additionally, the incoming call can be cellular voice calls or web-based voice or video calls. At block 306, the server selects one or more terminating caller devices to route the incoming calls based at least partially on the call routing scheme. The call routing scheme can utilize round robin to distribute calls evenly among a plurality of terminating caller devices, identify the first available terminating caller device of a plurality of terminating caller devices, lookup a call forwarding table, and/or so forth.

At decision block 308, the server determines whether the incoming call is answered by one of the selected terminating caller devices. In various embodiments, the call routing scheme can specify the duration in which the call should ring before the call is not answered. If the call is not answered ("no" response from the decision block 308), the server performs one or more call handling tasks for the incoming call, as indicated in block 310. Without limitations, the call handling tasks can include call alerting, providing voicemail access, and/or so forth. At block 312, the server obtains a call log to transmit to at least one user equipment. The call log can include call log information related to the routed call. The user equipment can include one or more terminating caller devices and/or another user equipment. Similarly, if the call is answered ("yes" response from the decision block 308), the server obtains the call log report to transmit to at least one terminating caller device, as indicated in block 312. Obtaining the call log report can include transmitting a query to one or more database servers (e.g., call log database) and/or caller devices that made or received the calls.

FIG. 4 is a flow diagram of an example process 400 for forwarding calls from a first group of terminating caller devices to a second group of terminating caller devices in accordance with a call routing scheme, from the perspective of one or more servers in a telecommunications network. At block 402, the server may retrieve from a database a call routing scheme for incoming calls received at one or more terminating caller devices. At block 404, the server selects a first group of one or more terminating caller devices to route an incoming call based at least partially on the call routing scheme. In this regard, the first group of terminating caller devices can include a single device or a plurality of devices. At block 406, the server determines whether one of the terminating caller devices in the first group answered the incoming call.

At block 408, upon determining that the incoming call is not answered, the server selects a second group of one or more terminating caller devices to route the incoming call based at least partially on the call routing scheme. The second group of terminating caller devices can include a single device or a plurality of devices. Thus, a call can be forwarded from a plurality of terminating caller devices to a plurality of terminating caller devices, or from a single terminating caller device to another terminating caller device. A call can also be forwarded from a single terminating caller device to a plurality of caller devices, and vice versa. The terminating caller devices can be associated with different phone numbers or with the same phone number.

FIG. 5 is a flow diagram of an example process for selecting one or more terminating caller devices in accordance with one or more settings for a call routing scheme, from the perspective of one or more servers in a telecommunications network. At block 502, the server determines whether a call routing configuration setting indicates that one or more terminating caller devices are to be selected for routing an incoming call based on a telephone number of an originating caller device. For instance, if a terminating caller device's address book includes the telephone number, that terminating caller device may be selected to answer the incoming call. In another example, if a terminating caller device blocked the telephone number, that terminating caller device may not be selected to answer the incoming call. At decision block 504, the server determines whether additional call routing and answering rules apply. If additional call routing and answering rules apply ("yes" response from the decision block 504), the server identifies one or more terminating caller devices to route the incoming call based at least partially on a telephone number of an originating caller device and one or more call routing and answering rules, as indicated in block 506. In various embodiments, the call routing and answering rules can include routing calls based on time of day or based on the availabilities of the terminating caller devices.

If additional call routing and answering rules do not apply ("no" response from the decision block 504), the server identifies one or more terminating caller devices to route the incoming call based at least partially on a telephone number of an originating caller device, as indicated in block 508. At block 510, the server performs one or more call handling tasks (e.g., call alerting, providing voicemail access, etc.) for the incoming call if the call is rerouted. The call can be rerouted from the one or more identified terminating caller devices if RNA timeout occurs, the call is refused, the recipient of the call is out of the office, and/or so forth. The call log information for the call can indicate that the call was routed to the one or more terminating caller devices and that the call was rerouted. Additionally, the call log information can indicate that one or more call handling tasks were performed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    organizing a call routing scheme based on call routing configuration settings, the call routing scheme directing routing of incoming calls to a first user device and a second user device that receive services from a telecommunications network, the first user device operated by a first subscriber of the telecommunications network and associated with a first user device identifier and the second user device operated by a second subscriber and associated with a second user device identifier;
    receiving a call log request from the first user device, the call log request including the first user device identifier;
    transmitting the call log request to a database server of the telecommunications network to obtain a call log for an incoming call to the first user device and the second user device, the incoming call being routed according to the call routing scheme; and
    sending, in response to determining that the incoming call is not routed to the first user device, the call log to the first user device, the call log comprising call log information including the second user device identifier of the second user device that answered the incoming call or missed the incoming call.

2. The one or more non-transitory computer-readable media of claim 1, wherein the call routing configuration setting is received from the first user device and organized into the call routing scheme following authentication of one or more user authentication credentials of a user that inputted the call routing setting.

3. The one or more non-transitory computer-readable media of claim 1, wherein the acts further comprise:
    routing the incoming call from the first user device to the second user device based at least partially on the call routing scheme, wherein the first user device is different from the second user device, further wherein the call log information can indicate whether the incoming call was answered at the second user device.

4. The one or more non-transitory computer-readable media of claim 3, wherein the first user device and the second user device are permitted to use a common telephone number.

5. The one or more non-transitory computer-readable media of claim 3, wherein the acts further comprise:
    routing the incoming call to a third user device based at least partially on the call routing scheme, wherein the second user device and the third user device can receive the incoming call simultaneously or in a sequential order, further wherein the call log information can indicate whether the incoming call was answered at the second user device or the third user device.

6. The one or more non-transitory computer-readable media of claim 1, wherein the first user device identifier and the second user device identifier comprise at least one of an International Mobile Equipment Identity (IMEI), a Mobile Equipment Identifier (MEID), an electronic serial number (ESN), a telephone number, and an Internet Protocol (IP) address.

7. The one or more non-transitory computer-readable media of claim 1, wherein the database server comprises a call log database.

8. The one or more non-transitory computer-readable media of claim 1, wherein the incoming call is a cellular call or a VoIP call.

9. The one or more non-transitory computer-readable media of claim 1, wherein the call log information comprises at least one of a call time, a call duration, a call type, one or more call forwarding reasons, and a call rejection reason.

10. A computer-implemented method, comprising:
    organizing a call routing scheme based on call routing configuration settings, the call routing scheme directing routing of incoming calls to a first user device and a second user device that receive services from a telecommunications network, the first user device operated by a first subscriber of the telecommunications network and associated with a first user device identifier and the second user device operated by a second subscriber and associated with a second user device identifier;
    receiving a call log request from the first user device, the call log request including the first user device identifier;
    transmitting the call log request to a database server of the telecommunications network to obtain a call log for an incoming call to the first user device and the second user device, the incoming call being routed according to the call routing scheme; and
    sending, in response to determining that the incoming call is not routed to the first user device, the call log to the first user device, the call log comprising call log information including the second user device identifier of the second user device that answered the incoming call or missed the incoming call.

11. The method of claim 10, wherein the call log information comprises at least one of a call time, a call duration, a call type, one or more call forwarding reasons, and a call rejection reason.

12. The method of claim 11, further comprising:
    selecting at least one of the call log information to include in the call log based at least partially on one or more user authentication credentials.

13. The method of claim 10, further comprising:
    routing the incoming call from a first user device to the second user device based at least partially on the call routing scheme, wherein the first user device is different from the second user device, further wherein the call log information can indicate whether the incoming call was answered at the second user device.

14. The method of claim 13, further comprising:
    forwarding the incoming call to a third user device based at least partially on the call routing scheme, wherein the call log information can indicate whether the incoming call was answered at the third user device.

15. The method of claim 13, wherein the first user device and the second user device are permitted to use a common telephone number, further wherein the first user device and the second user device can receive the incoming call simultaneously or in a sequential order.

16. The method of claim 10, wherein the first user device identifier and the second user device identifier comprise at least one of an International Mobile Equipment Identity (IMEI), a Mobile Equipment Identifier (MEID), an electronic serial number (ESN), a telephone number, an Internet Protocol (IP) address, and a universally unique identifier (UUID).

17. A system, comprising:
one or more non-transitory storage mediums configured to provide stored code segments, the one or more non-transitory storage mediums coupled to one or more processors, each configured to execute the code segments and causing the one or more processors to:
organize a call routing scheme based on call routing configuration settings, the call routing scheme directing routing of incoming calls to a first user device and a second user device that receive services from a telecommunications network, the first user device operated by a first subscriber of the telecommunications network and associated with a first user device identifier and the second user device operated by a second subscriber and associated with a second user device identifier;
receive a call log request from the first user device, the call log request including the first user device identifier;
transmit the call log request to a database server of the telecommunications network to obtain a call log for an incoming call to the first user device and the second user device, the incoming call being routed according to the call routing scheme; and
send, in response to determining that the incoming call is not routed to the first user device, the call log to the first user device, the call log comprising call log information including the second user device identifier of the second user device that answered the incoming call or missed the incoming call.

18. The system of claim 17, wherein the call routing scheme includes call routing and answering rules that apply when one or more predetermined conditions are met.

19. The system of claim 17, wherein the one or more processors are further configured to:
route the incoming call to a group of terminating caller devices based at least partially on the call routing scheme, wherein the group of terminating caller devices does not include the first user device, further wherein the call log information can indicate whether the incoming call was answered by at least one of the groups of terminating caller devices.

20. The system of claim 17, wherein the call log information comprises at least one of a call time, a call duration, a call type, one or more call forwarding reasons, and a call rejection reason.

* * * * *